March 8, 1960  R. H. EKLUND  2,927,602
VALVE SUPPORTING PANEL BOARD
Filed April 5, 1957  2 Sheets-Sheet 1
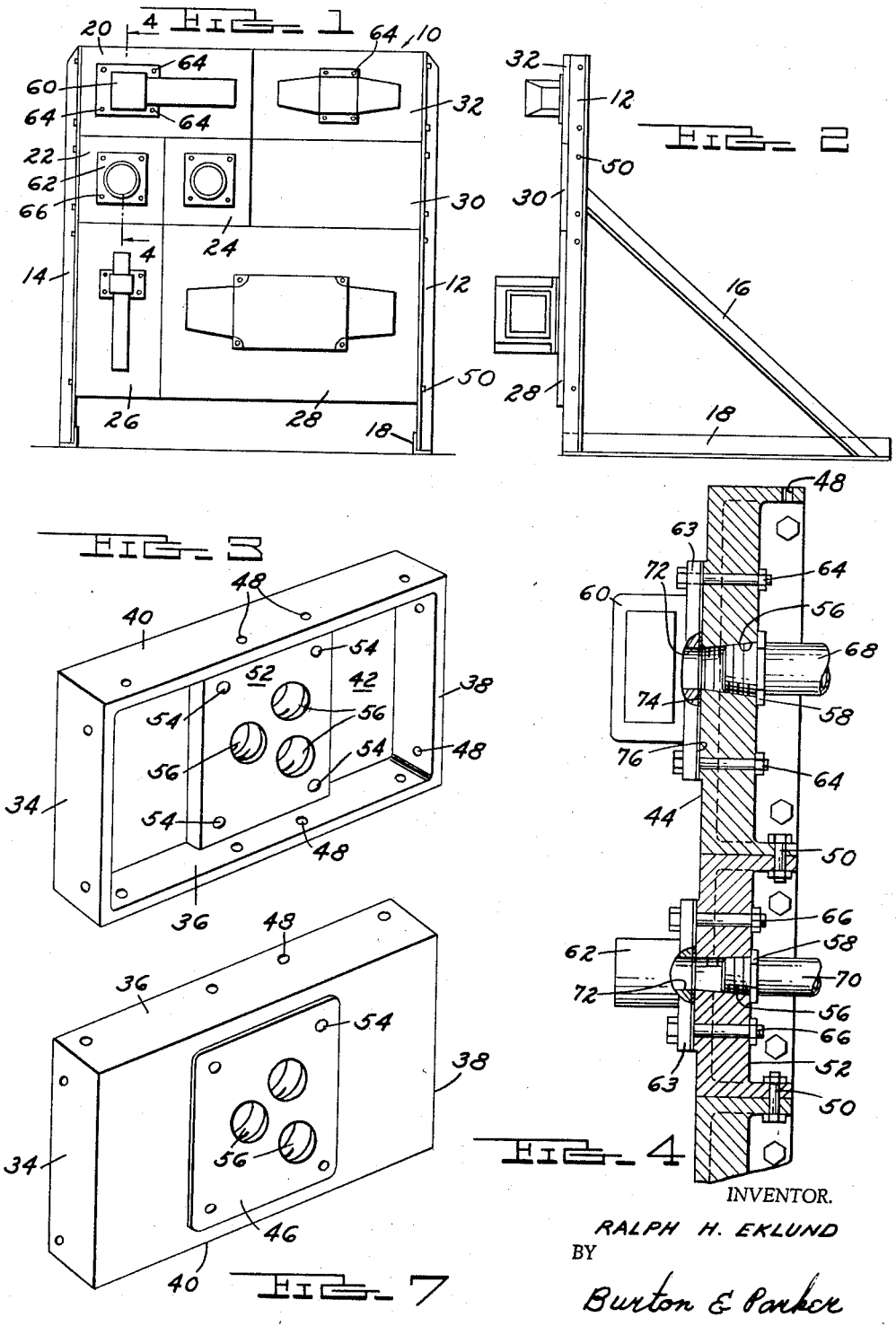
INVENTOR.
RALPH H. EKLUND
BY
Burton & Parker
ATTORNEYS

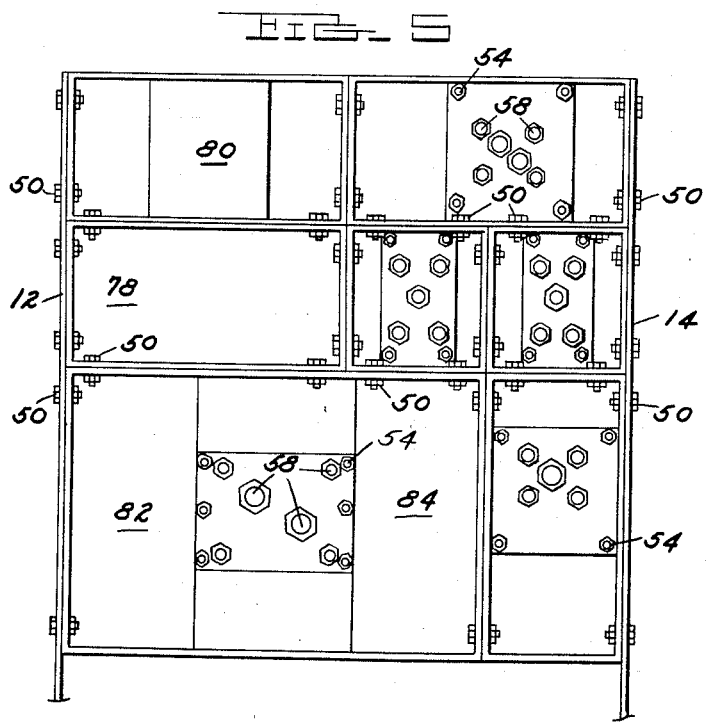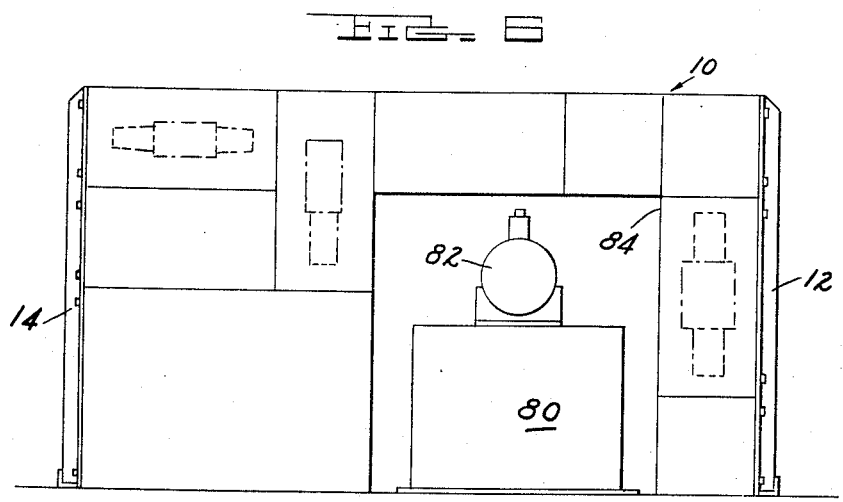

United States Patent Office 2,927,602
Patented Mar. 8, 1960

2,927,602

VALVE SUPPORTING PANEL BOARD

Ralph H. Eklund, Birmingham, Mich., assignor to Birmingham Hydraulics, Inc, Warren, Mich., a corporation of Michigan Application April 5, 1957, Serial No. 651,047

2 Claims. (Cl. 137—343)

This invention relates to a composite panel board, and panel sections therefor, for supporting a plurality of fluid pressure valves such as solenoid-controlled fluid pressure valves and related apparatus forming a part of a fluid pressure control system for machinery or the like.

Heretofore fluid pressure control valves have been mounted on panel boards which consisted of a sheet of iron or the like large enough to accommodate all the valves to be mounted on the panel board. Each valve was mounted on a sub-plate, and the sub-plate in turn was secured to the panel board. Each sub-plate was provided with fluid pressure couplings extending out of that face which abutted the panel board, and holes drilled through the panel board permitted the couplings to extend through the panel board to be connected to the lines of the fluid pressure system at the back of the board. The sub-plates permitted the replacement of valves mounted on the plates with new valves without disconnecting the fluid pressure lines of the fluid pressure system.

If an additional valve was to be added to the fluid pressure system, additional holes would be drilled through the panel and the sub-plate for the new valve mounted with the fluid pressure couplings of the plate extending through the holes drilled in the panel. If a valve on the panel was to be replaced by another valve of somewhat different design, the holes through the panel for the old valve sub-plate frequently would not be the correct spacing for the fluid pressure connections to the new valve sub-plate and substantial trouble was encountered in trying to mount the new valve on an already fully occupied panel of valves. This problem has become of substantial magnitude with the design of new valves to replace those presently in operation, or to increase the fluid capacity of the fluid pressure system by using larger valves with large sub-plates of differently spaced couplings than the couplings of the valve sub-plates presently in use.

If a valve mounted on the panel became defective during the operation of the machine controlled by the fluid pressure system of which the valve was a part, and the only available valve would not fit the sub-plate of the defective valve, the machine had to be shut down while new holes were drilled through the panel to accommodate the sub-plate couplings for the new valve.

An object of the present invention is to eliminate these disadvantages in present panel boards by eliminating the sub-plates as they have heretofore been known and providing a composite panel board consisting of standard size panel sections which, in addition to making up the panel board, serve as the sub-plates for the valves and which may be readily removed from or replaced in the composite panel board. The panel sections are each specifically adapted to mount a particular fluid pressure control valve as were the sub-plates.

Another object of the invention is the provision of a standard size panel section which is provided with marginal flanges with bolt holes through the flanges for connecting the section to other sections similarly dimensioned, with the section being provided with apertures therethrough for connecting a valve to the section, with the apertures in the section matching the fluid pressure ports and bolt holes of the valve.

Other objects, advantages, and meritorious features will more fully appear from the accompanying description, claims, and accompanying drawing, wherein:

Fig. 1 is a front elevation of my composite panel board;

Fig. 2 is an end view of the panel board shown in Fig. 1;

Fig. 3 is a perspective view showing the rear face of one of the panel sections for my composite panel board;

Fig. 4 is a cross sectional view taken on the line 4—4 of Fig. 1 showing the fluid connection between a fluid pressure system and valves mounted on the panel board;

Fig. 5 is a rear elevation of my composite panel board;

Fig. 6 is a front elevation showing another way in which my improved panel sections may be secured together to provide a panel board of different size and shape from that shown in Fig. 1 and built around the fluid pressure supply tank and pump for a fluid pressure system; and Fig. 7 is a perspective view showing the front face of a modified form of one of the panel sections.

A typical panel board according to my invention is indicated at 10 in Fig. 1. The board may be supported on the machinery that the valves on the board control, or may be supported by the fluid reservoir tank, or supported as shown in Fig. 1 in an upright position between a pair of angle iron members 12 and 14. The members 12 and 14 may be suitably braced by diagonal members 16 at each side of the panel board with floor members 18 extending from the lower ends of members 12 and 14 to the lower ends of member 16. Bolts extending through edges of the board secure the same to the uprights.

The board comprises a plurality of standardized planar panel sections indicated at 20, 22, 24, 26, 28, 30, and 32, in Fig. 1, which are disposed in coplanar edge-abutting relation and secured together at their abutting edges to form a rigid structure. The relative sizes of the sections are standardized such that they may be assembled in various combinations to fill out either the panel board shown in Fig. 1 or other shape and size panel boards such as that shown in Fig. 6. In order to accomplish this the dimensions of the sections are related as whole-number multiples of each other. In other words, panel section 20 is equal in size to the two panels 22 and 24 placed side by side; panel section 28 is equal in size to six of the sections 22 and 24 or three of the sections 26.

A typical panel section of the valve mounting fluid pressure panel type is shown in Fig. 3. It is generally plate-like in shape and while shown as rectangular, may be square. It is provided with perpendicular marginal flanges 34, 36, 38, and 40 which extend beyond the back face 42 of the section.

The front face includes a flat surface so that the valves may be bolted to the face and lie flush thereagainst. In one form the entire front face of the section is ground flat as at 44 in Fig. 4, while in another form the front face is provided with a boss 46 which is ground flat as shown in Fig. 7. The flanges are provided with bolt holes 48 which extend perpendicularly therethrough. The holes are equidistantly spaced apart in the flanges of all sections so that various size sections may be readily bolted together as shown in Fig. 5. The bolts holding the sections together extend through the flanges as shown at 50.

The central portion 52 in the rear or back face of each panel section may be of a greater thickness than the remaining portions of the section except through the flanges. Such central portion may be provided with bolt holes or valve mounting means 54 to receive bolts for securing the valve to the front face of the section and fluid inlet and outlet port means or apertures 56 for establishing fluid communication between a valve mounted on the section and the fluid pressure system to which the valve is connected. The apertures 56 may be threaded to receive a fluid pressure coupling 58. The bolt holes 54 and the apertures 56 for each panel section are in a determined layout or arrangement to match or correspond with the bolt holes and ports in a specific valve. In other words, for each type or size of fluid pressure valve there is a particular panel section having an aperture arrangement matching the bolt hole and port arrangement of the valve. There are at present about twenty different standard arrangements of bolt holes and fluid ports in the various valves manufactured. Consequently there would be a similar number of panel sections each having a somewhat different arrangement of bolt holes and fluid apertures therethrough to accommodate the various valves.

Fig. 4 shows a cross sectional view through a portion of the panel shown in Fig. 1. A pair of valves 60 and 62 having a base portion 63 through which bolts 64 extend, are secured to adjacent panel sections by means of bolts 64 and 66. Fluid pressure lines 68 and 70 are shown coupled with the fluid apertures 56 in the panel sections by means of the threaded couplings 58 threaded into the apertures. In some instances fluid pressure lines 68 and 70 might extend completely through the panel sections to couple directly to the valve. The apertures 56 match the ports 72 in the valves. A gasket or other sealing means 74 surrounds the ports between the back 76 of the valve and the front face of the panel section to prevent leakage.

Fig. 5 shows the back of a composite panel board embodying my invention and showing the fluid pressure couplings 58 threaded into or otherwise connected to the panel sections ready for attachment of the lines of a fluid pressure system. It will be noted that a number of the panel sections are blank, as at 78, 80, 82, and 84. When it is desired to add additional valves to the fluid pressure system these blanks are removed and the proper panel section for mounting the required valve is bolted in place. Certain of the blank sections may be employed to support pressure gauges, electric switches, or the like, if desired.

It will be noted that the bolts 50 at the opposite sides of the panel board secure the board to the uprights 12 and 14 so that no special holes need be drilled in the board for attaching it to the uprights.

In Fig. 6 the panel board 10 is shown as built around the fluid reservoir 80 and pump 82. To accomplish this it is only necessary to arrange the panel sections in a suitable arrangement to provide the opening 84 around the reservoir and pump. Of course it is understood that the panel sections shown in Fig. 6 would be provided with valves as illustrated in Fig. 1.

What I claim is:

1. A fluid pressure valve supporting panel board comprising a plurality of standardized generally planar panel sections dimensionally related as whole-number multiples of each other and each having a main plate and marginal flanges, said sections arranged in flange abutting coplanar relation, means extending through the flanges of abutting sections at standardized intervals rigidly removably securing the sections together to provide a rigid unitary structure, at least certain of said sections providing valve mounting fluid pressure panels, each main plate having a front face, said main plate having a fluid inlet port means providing a fluid inlet conduit and a fluid outlet port means providing a fluid outlet conduit and a valve mounting means, at least a portion of said front face being in a ground flat condition for sealably receiving a sealing means and a valve surrounding the fluid inlet and outlet port means, at least the portion of said main plate at the region of the ground flat portion of the front face being a predetermined thickness sufficient to withstand predetermined shock and operating forces, said fluid inlet and outlet port means being threaded to provide fluid pressure coupling means, the relative locations of said fluid inlet and outlet port means and said valve mounting means in each of said valve mounting fluid pressure panels conforming to a predetermined valve layout plan.

2. A fluid pressure valve supporting panel board as defined in claim 1 wherein said marginal flanges extend perpendicularly to the plane of the panel section, each flange provided with a plurality of bolt receiving holes at predetermined spaced locations, and wherein said means for rigidly removably securing the panel sections together are bolts.

References Cited in the file of this patent
UNITED STATES PATENTS 796,690   Wolf _____ Aug. 8, 1905
2,689,584  Dreyfuss _____ Sept. 21, 1954